Figure 17:
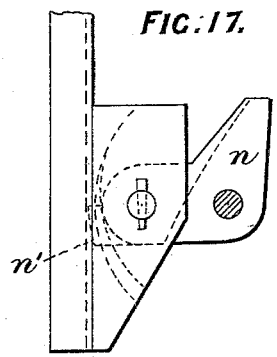

(No Model.) 5 Sheets—Sheet 1.
C. L. LASCH.
BOX STAPLING MACHINE.
No. 378,324. Patented Feb. 21, 1888.
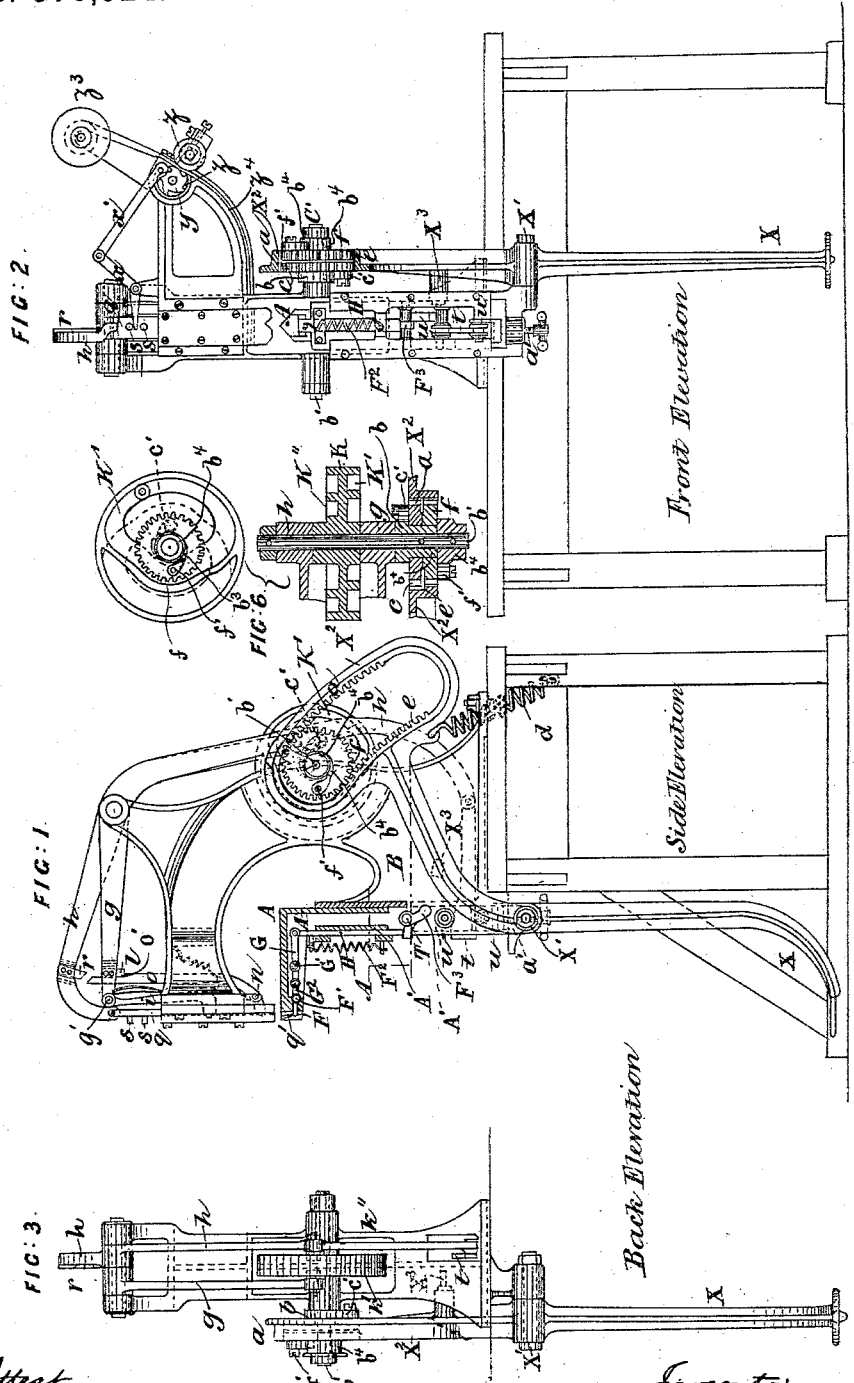

(No Model.) 5 Sheets—Sheet 2.
C. L. LASCH.
BOX STAPLING MACHINE.
No. 378,324. Patented Feb. 21, 1888.
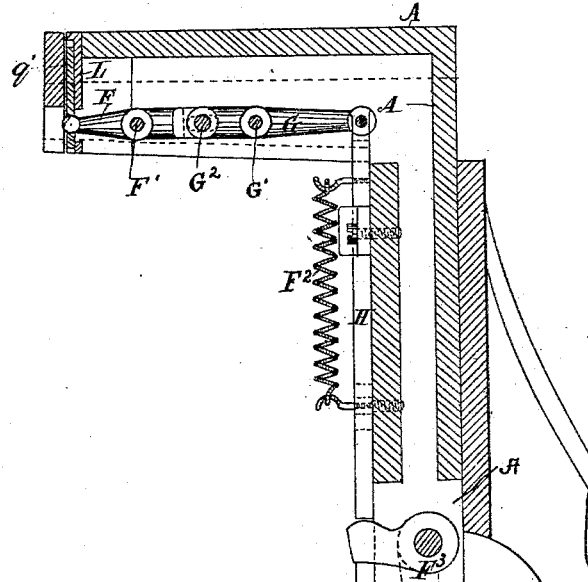
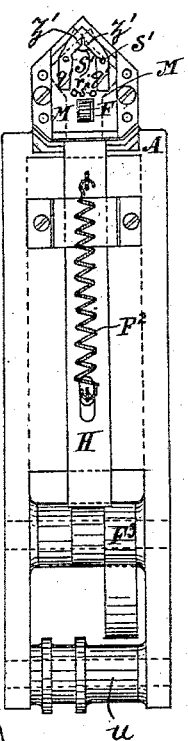
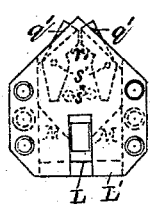
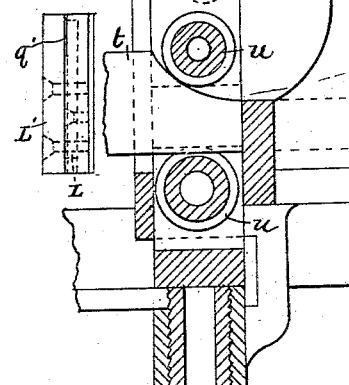
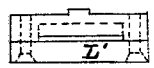
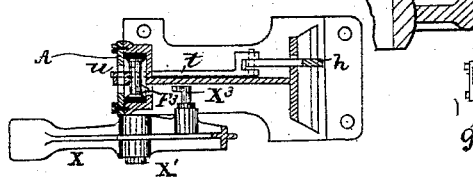
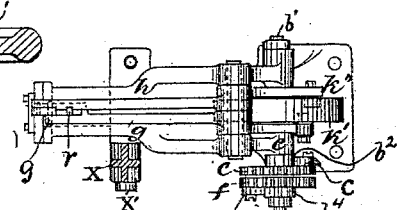

(No Model.) 5 Sheets—Sheet 3.
C. L. LASCH.
BOX STAPLING MACHINE.
No. 378,324. Patented Feb. 21, 1888.
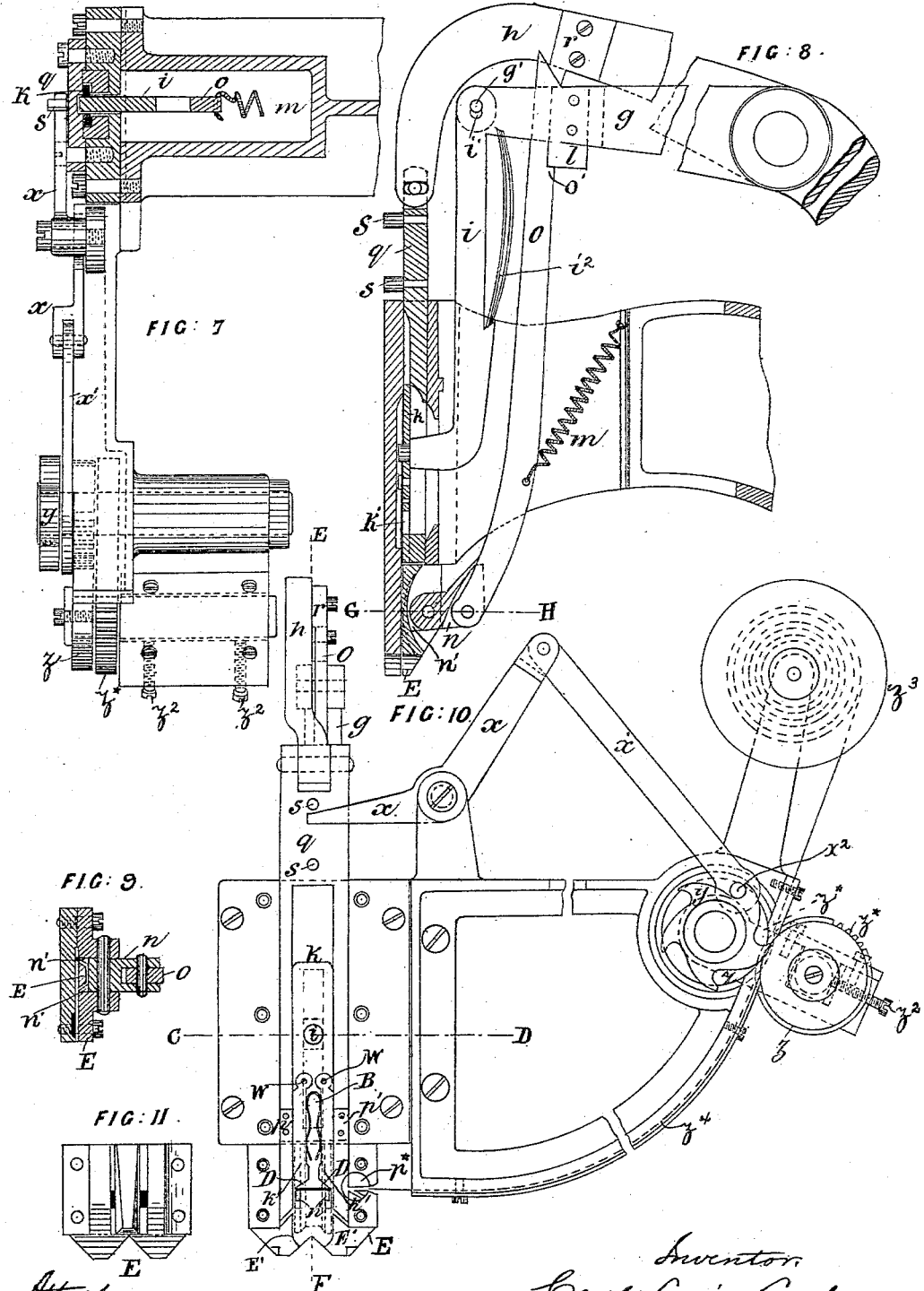

(No Model.) 5 Sheets—Sheet 4.

C. L. LASCH.
BOX STAPLING MACHINE.

No. 378,324. Patented Feb. 21, 1888.

Attest:
Edward Stern
L. H. Hopkins

Inventor:
Carl Louis Lasch
By Knight Bros.
Attorneys.

N. PETERS, Photo-Lithographer, Washington, D. C.

(No Model.) 5 Sheets—Sheet 5.

C. L. LASCH.
BOX STAPLING MACHINE.

No. 378,324. Patented Feb. 21, 1888.

Attest.
Edward Stern
L. J. Hopkins

Inventor
Carl Louis Lasch,
By Knight Bros
Attorneys

United States Patent Office.

CARL LOUIS LASCH, OF REUDNITZ, LEIPSIC, SAXONY, GERMANY.

BOX-STAPLING MACHINE.

SPECIFICATION forming part of Letters Patent No. 378,324, dated February 21, 1888.

Application filed December 15, 1885. Serial No. 185,764. (No model.) Patented in Germany June 13, 1884, No. 29,782, August 26, 1884, No. 32,571, November 14, 1884, No. 33,191, and December 25, 1885, Nos. 37,290 and 37,489; in France November 29, 1884, No. 165,649; in Belgium November 29, 1884, No. 67,050; in England December 8, 1884, No. 16,137, and June 15, 1886, No. 7,961, and in Austria-Hungary August 22, 1886, No. 4,233 and No. 35,677.

*To all whom it may concern:*

Be it known that I, CARL LOUIS LASCH, a subject of the Emperor of Germany, residing at Reudnitz, Leipsic, in the Kingdom of Saxony and Empire of Germany, gentleman, have invented new and useful Improvements in Box-Stapling Machines, of which the following is a specification.

This invention is embodied in the following patents, to wit: German Patents No. 29,782, dated June 13, 1884, No. 32,571, dated August 26, 1884, and No. 33,191, dated November 14, 1884, (additional patent on No. 29,782, dated June 13, 1884,) longest duration June 12, 1899; French Patent No. 165,649, dated November 29, 1884; Belgian Patent No. 67,050, dated November 29, 1884; English Patent No. 16,137, dated December 8, 1884; German Patents No. 37,290, dated December 25, 1885, and No. 37,489, dated December 25, 1885, (additional patent on No. 32,571, dated August 26, 1884,) longest duration August 25, 1899; English Patent No. 7,961, dated June 15, 1886, and Austro-Hungarian Patent No. 4,233 and No. 35,677, dated August 22, 1886.

In the accompanying drawings, Figure 1 is a side elevation, partly in section. Fig. 2 is a front elevation. Fig. 3 is a back elevation. Fig. 4 is a sectional plan drawn on the line A B, Fig. 1; and Fig. 5 is a plan, partly in section, representing my improved machine. Fig. 6 represents an end view and a horizontal section of the driving-gear. Fig. 7 is a horizontal section drawn on the line C D of Fig. 10. Fig. 8 is a vertical section drawn on the line E F of Fig. 10. Fig. 9 is a horizontal section drawn on the line G H of Fig. 8. Fig. 10 is a front elevation of the staple forming and driving mechanism, and Fig. 11 is a back view of the block E. Fig. 12 is a vertical section, and Fig. 13 is a front elevation, of the clinching apparatus. Figs. 14, 15, and 16 are respectively a front view, a side view, and a plan, of the operating parts of the same. Figs. 17, 18, 19, 20, 21, 22, and 23 represent various positions assumed by the operating parts in the manufacture, insertion, and clinching of a staple. Figs. 6 to 23 are drawn to larger scales than Figs. 1 to 5.

The machine is operated by a treadle-lever, X, pivoted, as at X', and provided at its upper end with an enlarged loop or elongated eye, $X^2$, whose inner sides or faces are concentric with the pivotal point of the lever and are provided with toothed segments or racks $a$ and $e$. These segments or racks are formed upon the opposite sides of the eye and in different planes, as represented in Fig. 6.

$b'$ is a shaft suitably journaled in the frame of the machine in such position that it will extend through the eye $X^2$ of the treadle-lever, occupying a position equidistant from its opposite segmental surfaces, $a$ and $e$, as shown in Figs. 1 and 6. Secured to this shaft is a wheel, $b$, having ratchet-teeth formed upon its periphery, and an elongated hub, $b^\times$, which projects through the eye $X^2$, the wheel proper being situated in a plane just outside the plane of the said eye. Journaled loosely upon this elongated hub $b^\times$ is a pair of cog-wheels, $c$ and $f$, whose teeth engage the racks $a$ and $e$, respectively, as represented in Fig. 6.

Pivoted to the outside of each of these cog-wheels is a pawl, $c'$ and $f'$, respectively, the former of which engages the teeth formed on the periphery of the ratchet-wheel $b$, and the latter corresponding teeth formed upon the periphery of a second ratchet-wheel, $b^4$, which is also secured to the shaft $b'$, as shown in Fig. 6. By locating the racks or segments $a$ and $e$ upon opposite sides of the axis upon which the cog-wheels rotate it will be seen that by a motion of the treadle-lever in either direction both cog-wheels will be rotated in opposite directions; hence by presenting all the teeth of the ratchet-wheels in the same direction it is obvious that, whatever be the direction in which the treadle-lever is moved, one or other of the pawls $c'$ or $f'$ will be in engagement with its ratchet-wheel, thereby converting a reciprocating motion of the treadle into a rotary motion of the shaft $d'$.

$d$ is a spring secured at one end to a fixed part of the frame or table and at the other to the treadle-lever, whereby the return motion of the latter is produced.

Secured to the shaft $b'$ is a wheel, K, having in its opposite faces cam-grooves K' and K", respectively, engaging lateral projections from the lower ends of levers $g$ and $h$, which transmit motion to all the various parts of the machine, the grooves being of such shape as to cause the several parts to move at the time and with the speed required to produce the results hereinafter described. For the purpose of lessening the amount of friction, the projections from the levers $g$ and $h$, which enter the grooves of the cam-wheel K, are provided with anti-friction rollers.

The lever $g$ is attached to the elastic lever $i$ by means of a pin, $g'$, in the end of the lever $g$, passing through a slot, $i'$, in the upper end of the lever $i$. The lower end of the elastic lever $i$ is turned forward and is pressed by a spring, $i^2$, into engagement with the plunger-plate $k$, which is moved up and down by said lever $g$, and has pivoted to the lower end thereof, by pins $w$, the driving and bending plates $k'$ $k'$. The lever $g$ has also connected thereto the stop $l$, against which the upper end of a lever, $o$, is held by the influence of the spring $m$, said lever $o$ being pin-jointed at its lower end to the tail end of a short lever, $n$, the front ends, $n'$, of which lever form an anvil upon which the wire for forming a staple is supported during the operation of cutting it off from the length connected with the reel, and bending it into the form of a rectangular staple, as will be hereinafter described.

Figure 20:
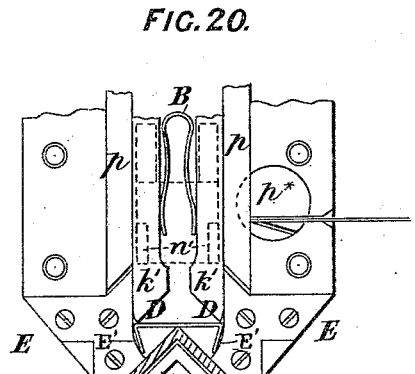
Figure 18:
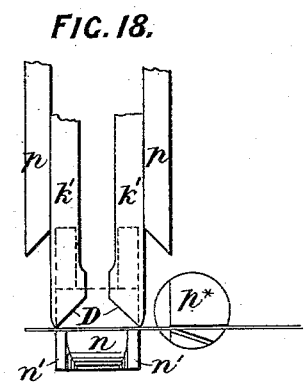
Figure 21:
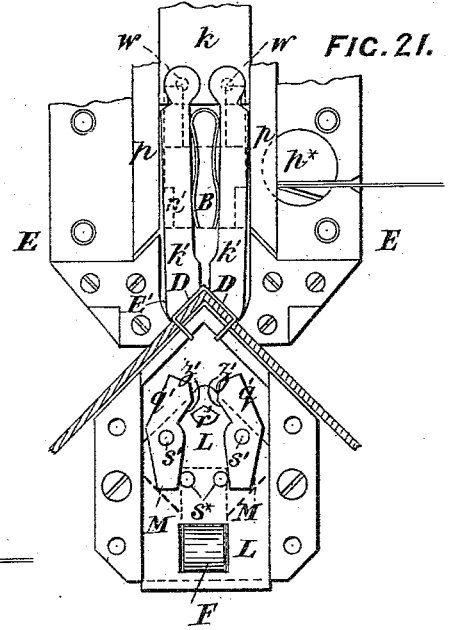
Figure 19:
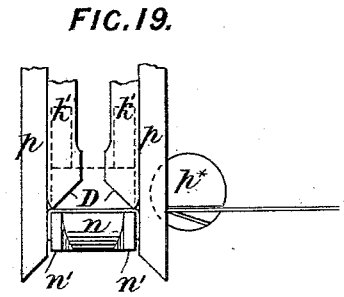
Figure 22:
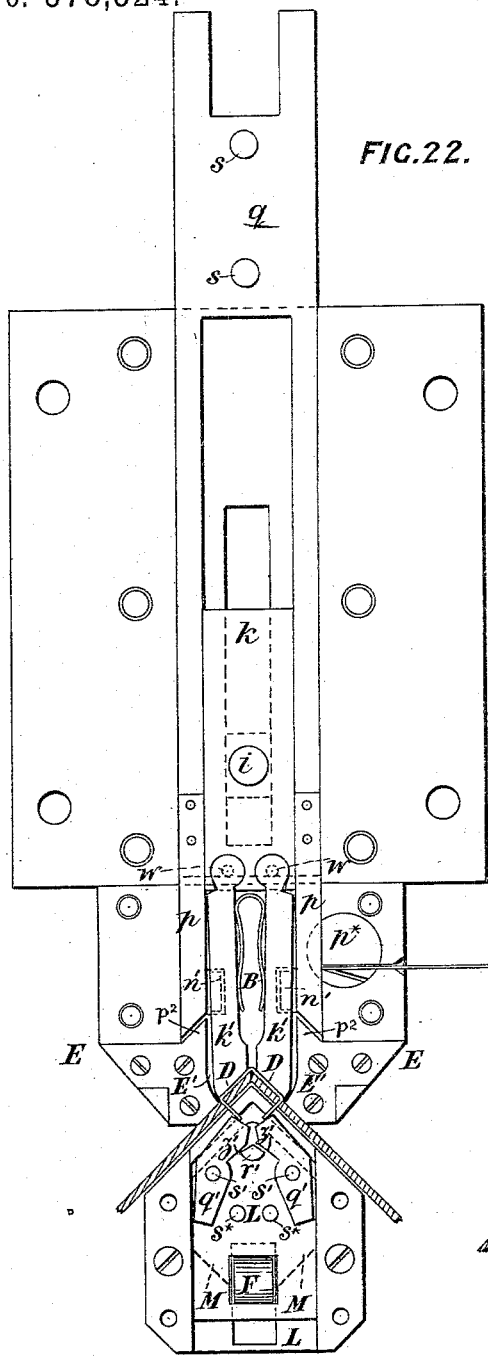

To the lever $h$ is attached the slide $q$, which at its lower end has fixed thereto the plates $p$ $p$, having the beveled lower ends, one of which, in combination with the fixed cutter $p^*$, serves to cut off the length of wire, while both act to bend such length of wire into the form of a rectangular staple, as shown at Fig. 19. This slide $q$, with its plates $p$ $p$, slides in a channel or way formed in the fixed head of the machine, the channel being of such size and shape as to snugly embrace the outside edges of the plate to prevent lateral motion. The lower end of the channel or way is formed with shoulders or offsets $p^2$, corresponding in size and shape to the ends of the projections $p$, so that when the plate $q$ is in its lowermost position, as shown in Figs. 20, 21, and 22, the inner surfaces of said slot shall be flush with the inner surfaces of said projections, thereby forming a continuous channel for the passage of the staple. The lever $h$ has also fixed on the upper part thereof the trip $r$, and at the lower part it is connected with a wedge-shaped slide, $t$. The to-and-fro motion of the segmental part $X^2$ of the treadle-lever X, and the consequent rotation of the cam K' K", causes the upper ends of the levers $g$ and $h$ to move downward. In such motion the stop $l$ on the lever $g$, by acting on the step $o'$, depresses the elastic lever $o$, and thereby presses the front or anvil end of the lever $n$ forward to support the wire, this position being shown in Figs. 8, 9, 17, 18, and 19. The lever $i$ simultaneously presses the plunger-plate $k$ downward, with the driving and bending plates $k'$ $k'$ on the wire, which has been fed forward into the space between such parts, as will be hereinafter described.

The wire is thus held between the driving and bending plates $k'$ and the anvil $n'$, as represented at Fig. 18. At this moment the descending lever $h$, by forcing down the slide $q$, causes the plates $p$ $p$, attached to such slide, to cut off a length of wire to form a staple and to bend the same over the anvil $n'$, as represented at Fig. 19. During the further downward motion of the lever $h$ and slide $q$ the lever $o$ is disengaged from the stop $l$ by the oblique end of the trip $r$ coming against the upper end of the lever $o$, when the latter, being free of such stops, is acted upon by the spring $m$, and is thereby caused to withdraw the anvil $n'$ from the rectangular staple, which has been bent over the same. In the further descent of the plunger-plate $k$ and bending-plates $k'$ the already-formed rectangular staple is, as shown at Fig. 20, forced down into the contracted walls of the channel or way formed in the head E, by which means the legs of the staple, by being forced against the curved sides of such contracted walls, are bent inward, so as to stand at an acute angle to the back of the staple and at or nearly at right angles to the sides of the box.

B represents a plate-spring, which is placed between the driving and bending plates $k'$ $k'$, for holding them in contact with the outer walls of the socket in which they work.

By the motion of the lever $h$ the wedge $t$ is also drawn between the rollers $u$ $u$, whereby the slide A', carrying the angular arm A, constituting the saddle or table for supporting the work, is raised so as to force the work (which is supported on the arm A) into contact with the under side of the head E.

Figure 23:
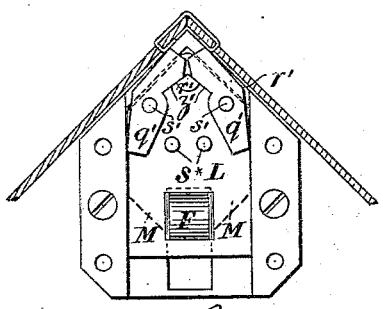

The upper roller $u$ is carried by the frame A' and the lower roller $u$ by bearings capable of being raised and lowered by a screw, $a'$, so as to enable the surface of the arm or saddle A to be regulated in height to suit different thicknesses of material to be operated upon. After the arm or saddle A has been raised so as to bring the work into contact with the lower end of the head E, the plunger-plate $k$ is still further depressed, whereby the legs of the staple are, as shown at Fig. 21, forced through adjacent sides of a box or other like article and at or nearly at right angles thereto, as shown in Fig. 21. The legs of the staple are made to enter in this peculiar manner and assume this peculiar shape by the combined instrumentalities of the downward-converging walls of the channel or way in which they travel, the movement of the driving and bending plates $k'$ $k'$ toward each other, their inclined ends which act in imparting the final pressure to the staple, and the angular form of the saddle or support upon which the work rests, the action of each of these parts being about as follows: As the staple is fed downward by the plates $k'$ $k'$, its legs are bent inward by the converging walls E' of the way, and so soon as the central part of the staple comes into contact with the uppermost corner of the box, Fig. 20, the continued downward movement of the plates $k'$ $k'$ will bend its back, causing the legs to enter the box at about right angles. Until the legs of the staple have been forced through the box the lowermost extremities only of the plates $k'$ $k'$ will bear upon it, the pressure being exerted directly in line with said legs, so as to avoid the danger of kinking the back of the staple. After the legs have passed through the box the outer edges of the plates will come into contact with the inclined walls $E'$ of the way, whereby the lower ends of said plates will be caused to approach each other until their inclined lower faces occupy positions at right angles to each other, as shown in Fig. 21. This will cause the staple to be pressed flat against the surfaces of the adjoining sides of the box, which are held at right angles to each other by the saddle or support A, whose top side inclines toward the center from opposite sides. As soon as the legs of the staple have been forced through the walls of the box or other like article, the clinching-plates of the saddle A, which serve to bend or clinch the legs of the staples, are set in operation by means of the following mechanism: In the interior of the arm A, on a plate, L, at the front end thereof, are pivoted on pins $s'$ $s'$ the bending or clinching plates $q'$ $q'$, having somewhat the shape of crank-levers. The plates $q'$ $q'$ are pivoted, as described, in order that their upper ends may be pressed together in such manner against the legs of the staples that the same shall be securely seized and pressed smoothly and flat against the walls of the pasteboard or other like box or article. This peculiar motion of the bending or clinching plates $q'$ is effected in the following manner: The plate L, carrying the pins $s'$ $s'$, the stops $s^*$ $s^*$, the small bearing $r'$, and the bending or clinching plates $q'$ $q'$, is raised and lowered by one end of a lever, F, which is mounted on an axis, $F'$, and at its other end is connected to the lever G, which is mounted on the axis $G'$ by a pin, $G^2$, working in a slot formed in the end of the lever F. The lever G is connected to a vertical slide or rod, H, which is raised by a crank-lever, $F^3$, operated by an arm or projection, $X^3$, on the treadle-lever X, a spring, $F^2$, acting to produce the reverse action of the parts. Thus when the plate L descends, the lower ends of the bending or clinching plates $q'$ are forced inward by coming against the fixed oblique faces M, carried by the covering-plate $L'$, whereby the upper ends of the said plates are slightly spread apart, as shown at Figs. 20 and 21, so that on rising their corners first press against the legs of the staples, and bend the same toward each other. Then, on further moving upward, the plates $q'$ receive support at $z'$, against the small bearing $r'$, by which they are caused to firmly press the legs of the staples against the inner walls of the box or other like article, as shown at Fig. 23. Stops $s^*$ are employed to limit the extent to which the clinching-plates open on the descent of the plate L. After the formation, insertion, and clinching of a staple has been completed, as above described, by the forward motion of the segmental portion $X^2$ of the treadle-lever X, the latter thereupon recedes, and all the parts resume their previous position, and during the ascent of the slide $q$ the pins $s$ $s$ thereon give motion to the crank-lever $x$ and driver $x'$, to one end of which it is connected, the other end of said driver being provided with a wrist-pin, $x^2$, projecting laterally from one side thereof, and adapted to engage successively the notches formed in the periphery of a wheel, $y$, secured to a shaft of one of a pair of feed-rollers, $z$. The gravity of the driver $x'$ is sufficient to cause its wrist-pin $x^2$ to fall into engagement with the teeth as the slide $q$ descends. Each of the feed-rollers $z$ is provided with a cog-wheel, which cog-wheels intermesh with each other, whereby they are compelled to rotate in opposite directions. The one which derives its motion from the other is mounted in movable bearings, a set-screw, $z^2$, being provided for adjusting it, as may be desired, to cause them to bite the wire and feed it to the machine.

The wire is carried by a bobbin, $z^3$, and after passing between the feed-rollers $z$ is conducted, by a curved guide, $z^4$, to the staple forming and driving mechanism.

I am aware of German Patent No. 29,269, dated March 30, 1884, and do not claim as my invention anything therein shown. Especially do I disclaim "hinged driving-plates" in any such broad sense as would comprehend the tilting blocks which are shown in said patent secured to the lower extremity of the driving-plate. These hinged blocks when placed end to end do not quite equal in length the width of the channel in which they travel, and are designed to bear at all times upon the back of the staple, from one end thereof to the other. Each of the plates employed by me is comparatively of much greater length than these tilting blocks of the German patent. They are pivoted at their upper ends to a vertically-movable slide and project side by side (substantially parallel to each other) down into the channel, far below their pivotal points. This difference is material, for the reason that the blocks of the German patent require special mechanism for tilting them, while the long plates employed by me are moved toward each other by simply impinging against the converging side walls of the channel. The operation of the two devices is also materially different. The pivotal arrangement of the tilting blocks of the German patent is such that when in normal positions their lower faces are flush with each other and horizontal, but when in their depressed position their faces converge upward at about right angles, the object being to have them bear at times upon the back of the staple from end to end. The movement of the lower extremities of the long plates employed by me is so slight that the angle which the lower faces of the respective plates form with each other remains practically constant. They converge upwardly and are designed to bear upon the staple only directly in line with its legs while forcing it through the box, and subsequently come in contact with it from end to end for shaping it.

Having now particularly described and ascertained the nature of my said invention and the mode in which I carry the same into effect, I would have it understood that what I claim is—

1. In a wire-stitching machine, the combination, with the staple-driver, the lever for operating it, and the cam-wheel for moving said lever, of a shaft, $b'$, carrying the ratchet-teeth, a pair of pinions mounted to turn freely about the axis of said shaft, a pawl secured to each of said pinions for engaging said ratchet-teeth, and a pair of reciprocating racks situated upon opposite sides of said shaft and engaging the respective pinions, substantially as set forth.

2. The combination of a vertically-movable arm, A, the wedge-shaped slide $t$, means, substantially as set forth, for operating said slide, friction-roller $u$, by which said slide is supported, and adjusting-screw $a'$, substantially as and for the purpose described.

3. A wedge-piece or trip, $r$, secured to the lever $h$, a lever, $o$, connected to and adapted to act on the bending-anvil lever $n$, and spring $m$, connected to said lever $o$, so as to cause the advance and withdrawal of the anvil $n'$, in combination with the lever $g$, having the stop $l$, substantially as herein shown and described, and for the purpose stated.

4. The combination, with the head having a channel converging downward, of a plunger and a pair of driving and bending plates hinged at their upper ends to said plunger and projecting downward into said channel, said channel and plates being so arranged that the lower extremities of the plates will be moved toward each other as they descend by impinging against the walls of the channel, substantially as set forth.

5. The combination, with the head having the channel with walls converging downward, of a pair of hinged driving-plates and a spring interposed between said plates, substantially as set forth.

6. The combination, with the vertically-movable work-supporting saddle or table and the staple-driving mechanism, substantially as described, of a pair of pivoted clinching-levers located beneath the table, and a reciprocating plate to which they are pivoted, substantially as set forth.

7. The combination, with the staple-driving mechanism, substantially as described, and the work-supporting table, having its top side inclined toward the center, of the reciprocating plate L, located beneath the table, the clinching-levers $q'$, pivoted thereto, and the bearings $r'$, secured to and carried by said plate, substantially as set forth.

8. The combination, with the staple-driving mechanism, substantially as described, and the work-supporting table, of the reciprocating plate L, located beneath said table, the clinching-levers $q'$, pivoted thereto, the inclined shoulders M, and the stops $s^*$, all constructed and arranged to operate substantially as set forth.

9. In a staple-driving machine, the combination, with a fixed head having a channel for the passage of the staples and a staple-driver, of a vertically-movable work-supporting saddle, substantially as set forth.

10. The combination, with the staple-driver and the head in which it works, of a vertically-movable work-supporting saddle adapted to be elevated so as to bring the work thereon in contact with the said head, and clinching-plates situated beneath said saddle, adapted to be operated after the saddle has reached the limit of its upward movement, substantially as set forth.

11. The combination, with the staple-driving mechanism, substantially as described, and the vertically-movable saddle having the anti-friction-roller $u$, of the sliding wedge $t$, upon which said roller bears, substantially as set forth.

12. The combination, with the staple-driving mechanism, substantially as described, and the work-supporting saddle, of the movable clinching device located beneath said saddle, the bell-crank $F^3$, the rod H, the levers connecting said rod with said clinching device, and the treadle-lever having the lug $X^3$, all constructed and arranged to operate substantially as set forth.

13. The combination, with the staple-driving mechanism, substantially as described, and the work-supporting saddle, of the clinching device, the vertically-movable plate L, to which it is secured, the pivoted lever F, engaging said plate at one extremity, the pivoted lever G, having slotted connection at one end with the lever F, the rod H, engaging the other end of the lever G, the bell-crank $F^3$, and the treadle-lever, all constructed and arranged to operate substantially in the manner and for the purpose set forth.

14. In a staple-driving machine, the combination, with staple-driving mechanism, substantially as described, and its operating-lever, of a cam-wheel, a shaft to which it is secured, a pair of ratchet-wheels secured to said shaft, a pair of pinions mounted to revolve freely about the axis of the shaft, and having the pawls secured thereto for engaging the respective ratchets, and the treadle-lever carrying racks engaging the respective pinions, substantially as set forth.

15. In a stapling-machine, the combination, with the operating-lever, the cam-wheel by which it is operated, and the shaft to which said wheel is secured, of a pair of ratchet-wheels also secured to said shaft, a pair of pinions mounted to revolve about the axis of said shaft, and having pawls for engaging the respective ratchet-wheels, and the pivoted treadle-lever having the enlarged eye provided on its opposite sides with the segmental racks engaging the respective pinions, substantially as set forth.

16. In a wire-stapling machine, the combination, with the pivoted anvil and the staple-driver, of a lever for operating said driver, connection engaged by said lever and engaging said anvil for holding it in operative position while the staple is being formed, the staple-forming plates, and a lever for operating it having a trip for throwing the anvil out of operative position immediately upon the completion of the staple, substantially as set forth.

17. The combination, with a pair of levers, g h, a pivoted anvil, and a lever, o, pivoted to the rear side of said anvil, of a stop secured to the lever g for pressing the anvil forward into operative position, the cutting and forming plates p, connected to the lever h, a trip, r, also secured to the lever h, for engaging the lever o, the driving-plates connected to the lever g, and means for operating said levers, substantially as set forth.

18. The combination, with the staple-driver and a fixed head in which it works, of a vertically-movable work-supporting saddle adapted to be moved up to the fixed head, and clinching-plates carried by said saddle, adapted to be operated after the saddle has been moved into contact with the head, substantially as set forth.

CARL LOUIS LASCH.

Witnesses:
ALBIN RUBED,
FELIX GEMPER,
*Both of Reudnitz.*